April 29, 1941.   G. S. RIPPEY ET AL   2,240,466
APPARATUS FOR SEPARATING LEAF SHEATHS
Filed March 7, 1940    2 Sheets-Sheet 1
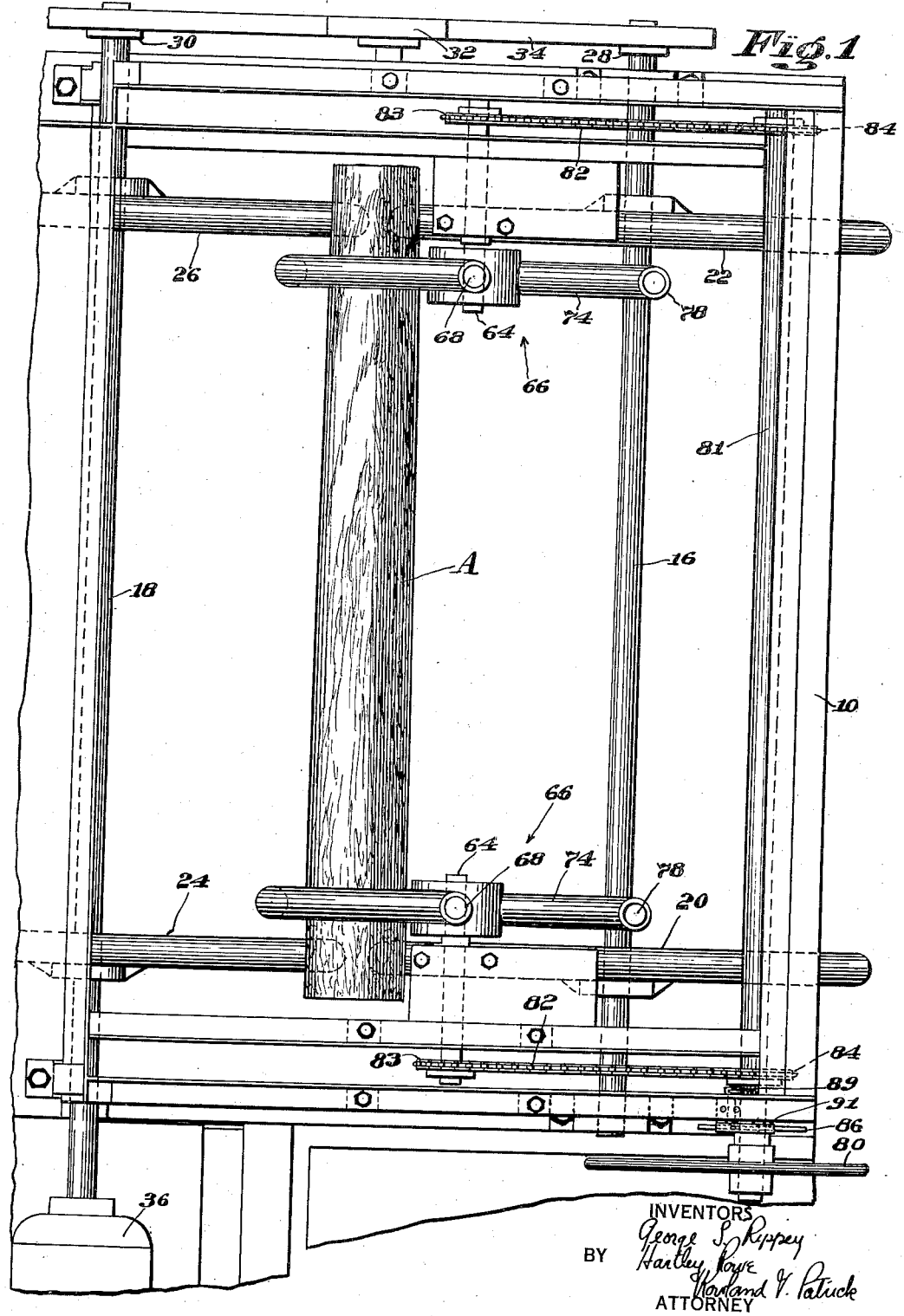
INVENTORS
George S. Rippey
BY Hartley Rowe
Howland V. Patrick
ATTORNEY

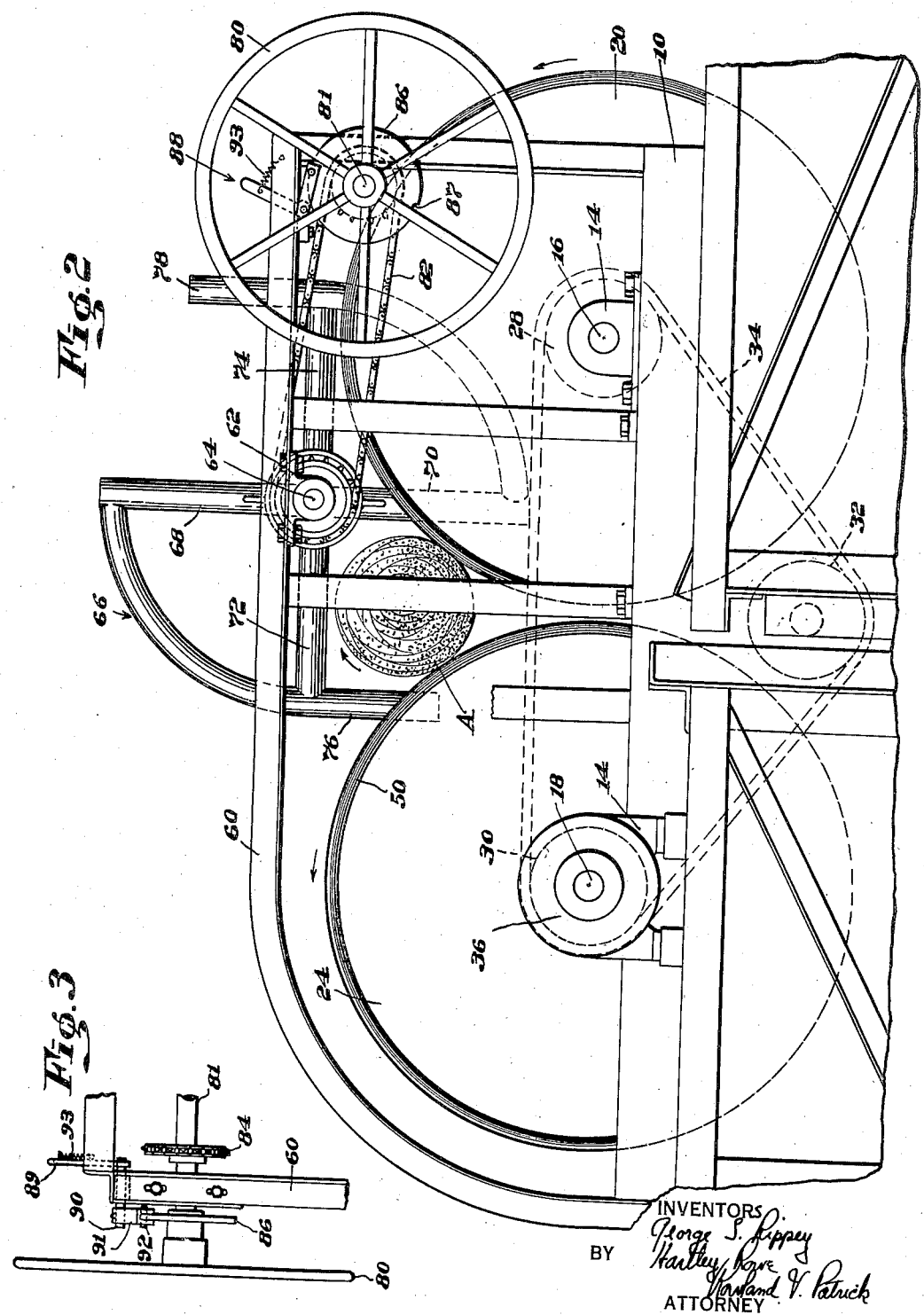

Patented Apr. 29, 1941

2,240,466

UNITED STATES PATENT OFFICE 2,240,466

APPARATUS FOR SEPARATING LEAF SHEATHS

George S. Rippey, Boston, and Hartley Rowe, Newton Center, Mass., assignors to United Fruit Company, Boston, Mass., a corporation of New Jersey Application March 7, 1940, Serial No. 322,802

13 Claims. (Cl. 19—5)

This invention relates to the preparation of long vegetable fibers for market from natural vegetable stalks, and is concerned particularly with apparatus for breaking down so-called "false" stalks into separate units which can be individually handled during the subsequent operation of cleaning the desired fibers of pulpy and other undesired material included in the original content of the unit.

The invention has been found especially suitable in the preparation of "manila" fiber for market from stalks of the abacá plant, although the invention is equally adapted for use in the breaking down of other stalks which have similar natural formation. The nature of the abacá plant and the distribution of fibers therein is well known to those acquainted with the industry, and reference is made to the description thereof contained in Bulletin No. 1 of the Fiber Standardization Board of the Department of Agriculture and Natural Resources of the Government of the Philippine Islands, entitled "The Standard Grades of Abacá," by M. M. Saleeby, Manila, Bureau of Printing, 1930. As therein fully described, the commercially desirable fibers are found in the leaf sheaths which form the stalk of the plant. The stalk is known botanically as a "false" stalk because it comprises, in the fully grown plant, a group of overlapping, crescent-shaped sheaths, laid tightly one upon another over a central core. Each leaf sheath contains the desired fibers extending substantially parallel to each other longitudinally of the sheath along its natural exterior section.

Heretofore, after the stalk has been cut down and the branches and leaves removed, the stalk has customarily been broken down into units of a size and form suitable for the subsequent cleaning operation by one of two manual operations. One operation involves separating an outside individual leaf sheath from the remainder of the stalk by starting an end or edge of the sheath with a sharp blade or pointed instrument, and then stripping the sheath from the rest of the stalk.

Another commonly used method involves starting a narrow width of the outer section only of an outside individual sheath with a sharp blade or pointed instrument, and manually stripping off from the sheath what is known as a "tuxy." After the entire outer section of one leaf sheath has been removed or "tuxied", the underlying interior pulpy section, which makes up the remainder of the sheath, is removed from the rest of the stalk, and then the operation is repeated on the next leaf sheath. This latter "tuxying" operation is used especially when the stalk is being prepared for a subsequent cleaning operation by manually passing the "tuxy" under a rigid knife blade spring- or weight-pressed against a block.

These manual separating operations are usually done in the field, and are highly time consuming and inefficient.

The primary object of our invention is the provision of apparatus for machine-separating with efficiency and dispatch the individual leaf sheaths which make up the false stalk. In our parent application, Serial No. 270,504, filed April 28, 1939, we point out that we have discovered that the adherence of leaf sheaths of this character is such that they may be successfully separated successively from the remainder of the stalk, by subjecting the sheaths to centrifugal forces which can be attained well within efficient and practical rotary speeds.

A further object of the invention, therefore, is the provision of apparatus for imparting centrifugal forces of this intensity to the individual leaf sheaths.

Such apparatus is illustrated in the accompanying drawings, wherein,

Fig. 1 is a plan view of the apparatus with parts of the frame broken away;

Fig. 2 is an end elevation of the apparatus with other parts of the frame broken away; and Fig. 3 is a detail of the feeding mechanism for the apparatus.

As indicated by the reference numerals, I provide a frame 10, which supports two parallel shafts 16 and 18, journalled in four bearings 14, two at each end of the machine. Each shaft has a pair of rotary elements fixedly mounted thereon. Thus, shaft 16 has disks 20 and 22, and shaft 18, disks 24 and 26, all shown as of equal diameter. The disks 20 and 24 are spaced from each other, but are mounted in substantially the same plane, while disks 22 and 26 are likewise mounted in spaced relation in a different plane at the other end of the machine. The four bearings 14 may if desired be mounted for adjustment towards and away from each other laterally of the machine, so that the spaces between the paths of rotation of the rotary elements, may be varied.

The shafts 16 and 18 are connected by power transmission means, which, in the drawings, take the form of pulleys 28 and 30, idler pulley 32, and belt 34, for rotation in synchronism in the same direction about their respective axes.

Driving means, such as a conventional electric motor 36, may be coupled to either one of the shafts, illustrated in the drawings as being shaft 18. Preferably the motor is of that type which is provided with automatic braking means, operable upon interruption of the current supplied to the motor, to cause the shafts to come to a rapid, complete stop.

In operation of this apparatus, a false stalk A, having been cut transversely to a predetermined suitable length, is positioned, as shown, between the converging surfaces of the rotary elements, where it is freely held under the influence of gravity. Upon supplying power, if the rotary elements are rotated in a counterclockwise direction, as indicated by arrows in Fig. 2, they will cause an opposite or clockwise rotation of the stalk A, due to the frictional rotational influence of the rotary elements.

As an aid to the proper driving of the stalk A, we have provided the rotary elements with rubber peripheral surfaces in the form of pneumatic tires, similar to bicycle tires, and indicated in the drawings by the reference 50. These tires not only tend to compensate for irregularities in the surface of the stalk operated upon, but also provide a cushioned surface which tends to prevent bouncing of the stalk. While all four tires may, if desired, be inflated to the same pressure, depending upon particular conditions of use, we have found that by suitable variance of the pressure maintained in the various tires, bouncing of the stalk may be further minimized. For instance, by inflating the tires 50 mounted on rotary elements 20 and 22 to a higher pressure than that in the tires 50 mounted on rotary elements 24 and 26, the rotary elements 20 and 22 are in effect provided with a slightly greater diameter than the elements 24 and 26. Because of this slight difference in diameter, the rotary elements 20 and 22 will have a slightly greater peripheral speed than that of the rotary elements 24 and 26, assuming that the shafts 16 and 18 have the same R. P. M. Since the elements 20 and 22 are moving downwardly at their point of contact with the stalk A, the differential speed between these rotary elements and the opposed upwardly operating rotary elements will tend to aid gravity by positively urging the stalk A downwardly between the opposing rotary elements. The relatively large diameters of the rotary elements contrasted to that of the stalk is also of some consequence as an aid in controlling the stalk during its rotation by preventing lateral swinging if the stalk does ride up on one periphery.

As a further aid in maintaining the stalk in proper position and preventing it from riding up on the periphery of any of the rotary elements, suitable guards may be mounted on the frame in such position as desired. In fact, a suitable guard may be arranged which can also act as a feeding means for the apparatus.

In order to support such feeding means, the frame 10 is supplied at each end with an overframe 60, each of which carries at its top a bearing 62 in which is mounted a stub shaft 64. Fixedly mounted on the inner end of the stub shafts are duplicate rotatable wheel-like stalk supporting and feeding means 66. Since both wheels 66 are similarly formed, a description of the one shown in Fig. 2 will suffice. The wheel 66 may be formed of pipe and include four arms 68, 70, 72 and 74 extending radially at intervals of 90°. At the extremity of the two opposite arms 72 and 74 are attached curved extensions 76, 78, which may, for support, extend to the extremities of the other pair of opposite arms 68, 70. By this arrangement the extensions 76 and 78 form with other portions of the wheel, namely, 68 and 74, and 70 and 72, respectively, two U-shaped recesses positioned at 180° about the shaft 64.

When, therefore, a stalk A is gravitationally disposed on the converging surfaces of the rotary elements, as shown in Fig. 1, the stalk is surrounded at each end by one of the U-shaped recesses. For instance, in Fig. 2, the stalk is surrounded by the recess formed by arms 70, 72 and extension 76 which thus form guards to limit lateral or vertical movement of the stalk A should excessive bouncing occur.

After one stalk A has been separated, ends of the succeeding stalk to be separated may be placed in the other recess as formed by the arms 68, 74 and extension 78 on the wheel 66.

In order to feed the stalk from this position into operative position, mechanism for rotating the wheels 66 at 180° is provided. This mechanism includes a hand-wheel 80 mounted on a shaft 81 which, as shown in Fig. 1, extends the length of the machine and is journalled in suitable bearings on overframe 60. The shaft 81 is operatively connected at each end with the stub shafts 64 by sprocket chains 82 which engage sprocket wheels 83 and 84 mounted respectively on the shafts 64 and 81.

Rotation of hand-wheel 80 therefore imparts rotation to the wheels 66.

Preferably, some mechanism is provided to retain the wheels 66 against rotation in the positions shown, and in alternative positions at an 180° interval. As illustrative of one form of such mechanism, there is shown a disk 86 mounted on shaft 81 and having in its periphery at 180° intervals two notches 87. Pivoted on the overframe 60 is a bell-crank mechanism 88 including a hand-lever 89, a shaft 90, and an arm 91 and pin 92. The pin 92 is adapted to drop into the recesses 87 under the influence of a spring 93 running from the hand-lever 88 to the overframe 60. The shaft 81 may therefore be released by moving the hand-lever 89 to the left, as shown in Fig. 2, thus moving the pin 92 out of the recess 87. The pin 92 may thereupon ride along the periphery of disk 86 until it falls into the opposite recess 87. At this point, the wheels 66 have also revolved 180°.

In use of our apparatus we have found it convenient to employ rotary elements having a 3-foot diameter, and the electric motor has been designed to drive the rotary elements at approximately 300 R. P. M., thereby imparting a peripheral speed of approximately 900 pi feet per minute. If, therefore, the stalk initially has a diameter of 8 inches at the point of contact with the rotary elements, the stalk will rotate at 1350 R. P. M., disregarding slippage. As the stalk decreases in diameter, with the successive throwing off of its outer sheaths, its R. P. M. will obviously increase, if the rotary elements maintain a constant speed. For instance, as the stalk decreases from 8 inches to 3 inches in diameter, the R. P. M. of the stalk will increase from 1350 R. P. M. to 3600 R. P. M., the peripheral speed remaining theoretically at 900 pi feet per minute. It is of course true that one end of the stalk is likely to be of somewhat smaller diameter than the other end, but the slight difference does not materially affect the operation even when all the rotary elements are driven at uniform speed.

We have found that such stalk speeds provide centrifugal force sufficient or in excess of that necessary to separate the outside leaf sheaths, one after another. This force can be expressed as being in the range of between $28-.42rw$ pounds and $255.78rw$ pounds, where $r$ represents the distance in inches from the axis of rotation of the stalk to the center of gravity of the individual leaf sheath to be separated, and $w$ represents the weight in pounds of the individual leaf sheath to be separated. The force varies of course as each outside sheath becomes torn away due to the decrease in the value of $r$, and the increase in the R. P. M. of the stalk.

It is obvious that the dimensions of the apparatus, including the diameter of the rotary elements, may be changed as desired. However, it is desirable to keep the contact faces of the rotary elements relatively narrow in axial dimension so that the strips will be completely freed from the remainder of the stalk as they are thrown off. Also, we have found it convenient to supply a hood (not shown) over the machine to prevent the separated sheaths from unruly flying and a hopper-like receptacle (not shown) under the apparatus to collect the separated sheaths. Such receptacle may have a central bottom opening. The spacing of the rotary elements may be such as to permit the stalk to pass therebetween after sufficient of the sheaths have been separated to reduce the diameter of the stalk to say about 1½ inches. The core of the stalk is thus automatically disposed of, after the sheaths containing the commercially desirable fibers have been separated, by dropping down between the rotary elements, and the motor is thereupon shut off to permit positioning of the next stalk to be separated.

It is likewise obvious that slippage occurs in the driving action between the rotary elements and the stalk, so that the driving speeds of the rotary elements will have to be controlled to impart such speeds of rotation to the stalk as will provide the centrifugal force necessary to separate the outside leaf sheath initially, and successive outside sheaths thereafter.

This application is a continuation in part of our prior co-pending application, Serial No. 270,504, filed April 28, 1939.

We claim:

1. Apparatus for subjecting a false stalk of vegetable matter to centrifugal forces sufficient to throw off successively from said stalk separable leaf sheath units thereof, comprising a frame, two spaced pairs of rotary elements, each pair being mounted on said frame for rotation about a common axis, each of the peripheries of one pair being disposed substantially opposite the respective peripheries of the other pair, the distance between the axis of one pair and the axis of the other pair being greater than the diameter of the false stalk to be operated upon, and said pairs of rotary elements being adapted to hold a false stalk in peripheral engagement therebetween, and means for spinning said rotary elements in the same direction about their respective axes at continuous high speeds whereby a false stalk so held may be frictionally rotated at a peripheral speed developing centrifugal forces in an amount sufficient to separate an outside leaf sheath unit of the rotating stalk from the remainder, a substantial space between the two rotary elements of each pair and around a stalk so held being unobstructed to permit a centrifugally impelled leaf sheath to fly free of the rotating stalk.

2. Apparatus in accordance with claim 1, in which the rotary elements are of substantially equal diameter.

3. Apparatus in accordance with claim 1, in which the rotary elements are of substantially equal diameter and the rotary element spinning means is adapted to drive the elements in synchronism.

4. Apparatus in accordance with claim 1, in which the rotary element spinning means is adapted to drive the rotary elements at substantially uniform peripheral speeds.

5. Apparatus in accordance with claim 1, in which the peripheries of the rotary elements comprise rubber friction surfaces.

6. Apparatus in accordance with claim 1, in which the peripheries of the rotary elements comprise pneumatic tires.

7. Apparatus in accordance with claim 1, in which the peripheries of the rotary elements comprise pneumatic tires, and the pneumatic pressures in the tires of the rotary elements on one shaft are higher than the pneumatic pressures in the tires of the rotary elements on the other shaft.

8. Apparatus for subjecting a false stalk of vegetable matter to centrifugal forces sufficient to throw off successively from said stalk separable leaf sheath units thereof, comprising a frame, two spaced pairs of rotary elements, each pair being mounted on said frame for rotation about a common horizontal axis, each of the peripheries of one pair being disposed substantially opposite the respective peripheries of the other pair, said pairs of rotary elements being adapted to support a false stalk in peripheral engagement therebetween, and means for spinning said rotary elements in the same direction about their respective axes at continuous high speeds whereby a false stalk so supported may be frictionally rotated at a peripheral speed developing centrifugal forces in an amount sufficient to separate an outside leaf sheath unit of the rotating stalk from the remainder, a substantial space between the two rotary elements of each pair and around a stalk so supported being unobstructed to permit a centrifugally impelled leaf sheath to fly free of the rotating stalk.

9. Apparatus in accordance with claim 8, in which the peripheries of the rotary elements comprise pneumatic tires, and the tires of those rotary elements which rotate in a downward direction at points in their paths of revolution nearest the paths of the opposed rotary elements have higher inflation pressures than the tires of the other rotary elements.

10. Apparatus in accordance with claim 8, in which the peripheries of the rotary elements comprise pneumatic tires, and the rotary element spinning means is adapted to drive those rotary elements whose peripheries move in a downward direction at points in their paths of revolution nearest the paths of revolution of the opposed rotary elements at a slightly greater peripheral speed than the peripheral speed of the rotary elements on the other shaft.

11. Apparatus for subjecting a false stalk of vegetable matter to centrifugal forces sufficient to throw off successively from said stalk separable leaf sheath units thereof, comprising a frame, two spaced pairs of rotary elements, each pair being mounted on said frame for rotation about a common axis, each of the peripheries of one pair being disposed substantially opposite the respective peripheries of the other pair, said pairs of rotary elements being adapted to hold a false stalk in peripheral engagement therebetween, means for spinning said rotary elements in the same direction about their respective axes at continuous high speeds whereby a false stalk so held may be frictionally rotated at a peripheral speed developing centrifugal forces in an amount sufficient to separate an outside leaf sheath unit of the rotating stalk from the remainder, a substantial space between the two rotary elements of each pair and around a stalk so held being unobstructed to permit a centrifugally impelled leaf sheath to fly free of the rotating stalk, and means for feeding a stalk into peripheral engagement with said rotary elements.

12. Apparatus in accordance with claim 11, in which the feeding means is adapted to act as guard means, spanning a stalk positioned in contact with the peripheries of said rotary elements to limit movement of said stalk away from contact with the peripheries of said rotary elements.

13. Apparatus in accordance with claim 11, in which the feeding means includes a U-shaped holder adjacent each pair of rotary elements, each holder being adapted to support one end of a vegetable stalk, and said holders being simultaneously invertible to a position spanning the nip of said rotary elements, and cooperating to limit movement of said stalk away from contact with the peripheries of said rotary elements.

HARTLEY ROWE.
GEORGE S. RIPPEY.